United States Patent [19]

Weh

[11] Patent Number: 5,051,641
[45] Date of Patent: Sep. 24, 1991

[54] TRANSVERSAL FLOW MACHINE IN ACCUMULATOR ARRANGEMENT

[75] Inventor: Herbert Weh, Braunschweig, Fed. Rep. of Germany

[73] Assignee: J. M. Voith GmbH, Heidenheim, Fed. Rep. of Germany

[21] Appl. No.: 397,477

[22] PCT Filed: Feb. 5, 1988

[86] PCT No.: PCT/EP88/00086

§ 371 Date: Aug. 11, 1989

§ 102(e) Date: Aug. 11, 1989

[87] PCT Pub. No.: WO88/06375

PCT Pub. Date: Aug. 25, 1988

[30] Foreign Application Priority Data

Feb. 13, 1987 [DE] Fed. Rep. of Germany ....... 3705089

[51] Int. Cl.$^5$ ............... H02K 21/12; H02K 41/03; H02K 29/00
[52] U.S. Cl. .................................. 310/163; 310/162; 310/257
[58] Field of Search ................ 310/156, 162, 163, 257

[56] References Cited

U.S. PATENT DOCUMENTS 3,411,059  11/1968  Kaiwa et al. ..................... 318/138

FOREIGN PATENT DOCUMENTS 0126997  12/1984  European Pat. Off. .
0201021  11/1986  European Pat. Off. .
2925867   1/1981  Fed. Rep. of Germany .
3536538   4/1987  Fed. Rep. of Germany .
3602687   8/1987  Fed. Rep. of Germany .
56-3570   4/1981  Japan .
405495    7/1966  Liechtenstein .

Primary Examiner—William H. Beha, Jr.
Assistant Examiner—Judson H. Jones
Attorney, Agent, or Firm—Jeffers, Hoffman & Niewyk

[57] ABSTRACT

The invention relates to an alternating current motor comprising a rotor having an exciter part arranged therein and a stator having two fixed armature coils wherein each of the coils is surrounded on three sides by U-shaped soft iron elements forming the stator poles and air gap. The free ends of the soft iron elements are shifted by one pole division against one another. A series of soft iron blocks form the exciter poles with the polarity of the poles alternating along the direction of rotation. Between the soft iron blocks of the rotor exciter part are arranged permanent magnets magnetized with alternating polarity wherein the face surface of the permanent magnets lying opposite the soft iron blocks is greater than half the face surface of the exciter poles formed by the soft iron blocks on the air gap.

16 Claims, 3 Drawing Sheets

TRANSVERSAL FLOW MACHINE IN ACCUMULATOR ARRANGEMENT

In known alternating current motors of the type mentioned (EP-A-201 021) the no-load field is generated over permanent magnets embedded in the rotating exciter part, the flux-conducting pole surfaces of which face the air gap plane. With this construction of the exciter system the forces rise with increasing magnet thickness. The force increase finds its limit when the magnet height comes into the vicinity of the pole division. Then the effectiveness of the armature field declines, since this no longer extends into the inner zone of the permanent magnets. The armature field then goes more and more over into a stray field running in longitudinal direction. This field behavior is to be seen in connection with the fact that on each armature side there are arranged pole elements with alternating polarity. Corresponding to potential differences thus present there are formed stray fluxes which are superposed on the force-forming field components. They load the magnetic circuit, increase the inductance and thereby contribute to the retardation of the commutation.

Because of the limitation of the magnet height the possibilities of reducing the pole division are further limited. A reduction of the pole division leads in the known alternating current motors to a reduction of the magnet height and therewith necessarily to a flux reduction. A small pole division, however, is desired in machines (motors) with transverse flux conduction, since it makes possible lower winding losses by reason of the smaller effective winding length.

It is further a known practice (EP-A126 997) to use permanent magnets not only in the form of direct allocation to the useful gap (flat arrangement) in which the flux density in the useful gap is about equal to that of the permanent magnets, but also in collector configuration in which the permanent magnets lie substantially perpendicular to the useful gap. The permanent magnets lie here between soft iron poles, and the cross section area of the permanent magnets is greater than the surface of the pole facing the useful gap. Hereby the flux density in the magnet can be kept less than in the useful gap. The disadvantages of the known collector arrangement lie in high armature feedback (Rückwirkung) and great stray flux. These disadvantages are excluded according to the teaching of EP-A-126 997 by the means that the soft iron poles of the rotor present two adjacent partial poles, between which there is provided a magnetically nonconducting separating gap that is greater than the useful gap, and that the partial poles are constructed to converge proceeding from the useful gap. The partial poles there are expediently divided transversely to the direction of movement into a plurality of pole lamellae which are separated by nonmagnetic interspaces and which reduce the strong armature feedback arising with undivided poles. Further, the construction of the partial poles with pole lamellae as well as magnet height as great as possible is supposed to counteract a field distortion in the useful gap.

The problem of the invention is to construct alternating current machines of the type according to the category in such a way that such motors are feasible both with higher efficiencies and also with higher performance densities.

This problem is solved according to the invention by the features set forth hereinafter.

The construction of the exciter part according to the invention offers also advantages for the layout of the stator. The smaller magnetically active air gap, as compared with the flat arrangement, allows for equal force densities a smaller armature flooding. It is also possible, however, with equal armature flooding to achieve a higher force density (force per volume unit and force per mass unit).

Expedient formations of the invention are object of the dependent claims.

The invention is illustrated in the drawing in examples of execution and is described in detail in the following with the aid of the drawing. In particular:

Figure 1:
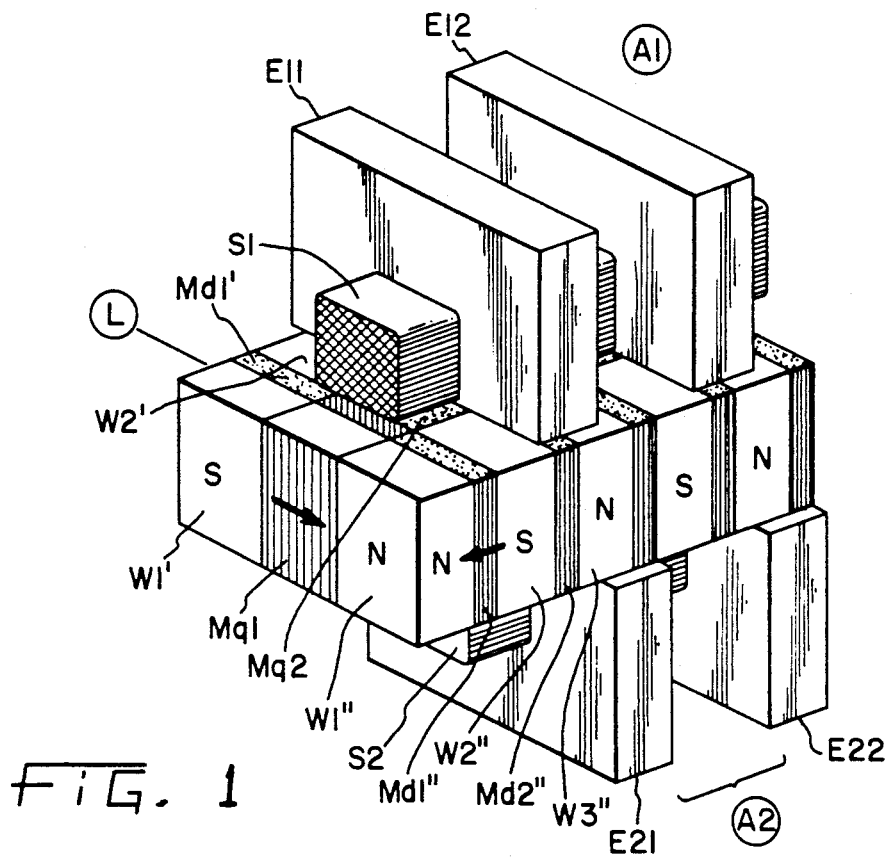
FIG. 1 shows schematically the structure of the alternating current motor.

In FIG. 1 there is to be seen an upper armature arrangement A1 and a lower armature arrangement A2, which connect over the air gap to the rotor (Läufer) L. The arrangement is drawn for simplification in linear form. The armature arrangement A1 consists then of the pole elements E11, E12, . . . conducting the magnetic field and the allocated part of the armature coil S1.

An analogous designation of the corresponding elements is provided for the arrangement A2. It is perceptible that the armature arrangement has pole elements in the spacing of twice the pole division, from which it is evident that therewith in each case there is present equal polarity. Stray flux components in longitudinal direction are avoided, in constrast, say, to the known arrangement according to WO 87/02525.

The part of the rotor L conducting the magnetic field is alternately composed of soft magnetic material and of permanent magnets.

In the general case permanent magnets $Mq1$, $Mq2$ . . . are provided in each case with alternating polarity in the middle zone of the rotor. There the magnet $Mq1$ is fitted between two soft iron parts $W1'$ and $W1''$, whose high magnetic conductivity yields a virtually resistance-less connection of the permanent magnets to the air gap plane. The soft iron pole elements W of the rotor undergo a supporting magnetization through the parmenent $Md'$ and $Md''$ arranged with their magnetization direction toward the axis of movement. As is to be learned from FIG. 1, on the left rotor side there is present a magnet series $Md1'$, $Md2'$. . . , while on the right there is arranged a magnet series with the magnets $Md1''$, $Md2''$. . . . Further below there will be gone into the matter that in each case only one magnet group, therefore either Md or Mq, already yields the full functioning capacity of the rotor. Both the combination of the two magnet groups and also the dispensing with the one or the other group can prove favorable, depending on use.

Figure 2:
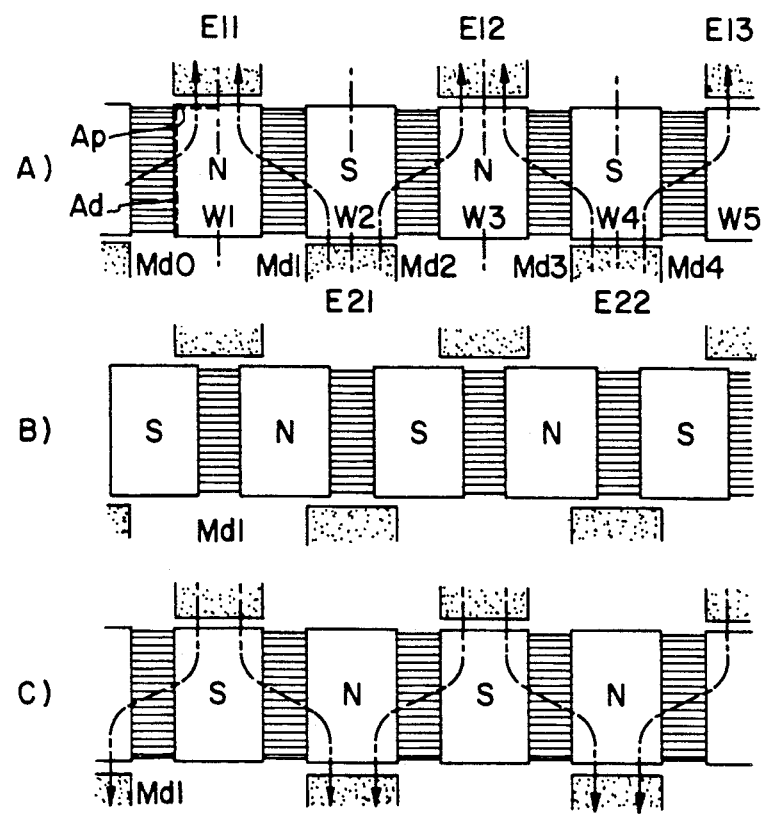
FIG. 2 shows the magnetic fluxes evoked by the permanent magnets in three different positions of the exciter part relative to the armature part.

The function of the transverse flux motor in the manner here described can be explained briefly in the form, with FIG. 2, that reference is made to the magnetic fluxes evoked by the permanent magnets in the armature elements E1 and E2. In the rotor there the magnets Md0, Md1 . . . as well as the soft iron elements W1, W2 . . . are designated.

In the position a then the flux generated by the magnet Md in the direction from south to north pole (in longitudinal direction) enters through the magnets and over into the soft iron zone, for example W1, in order from there to pass through the air gap and to enter the pole element E11. Over this it is led around the conductors S1, comes back on the other rotor side, goes there driven again through the permanent magnets M2 through a pole division in longitudinal direction, passes through the air gap, surrounds with the aid of E21 the coil S2 and thus closes the flux path in the soft iron element W2.

FIG. 2b shows the rotor position that is yielded after displacement by $\tau/2$ with respect to FIG. 2a. Here, by reason of the symmetry of the magnets with respect to the pole elements a magnetic flux is not active in the armature circuit.

After a further displacement by $\tau/2$ there can be shown with FIG. 2c that the magnetic flux again takes on a maximal value, but now, in comparison to FIG. 2a, it has the opposite direction. Therewith it is made clear that the magnetic flux surrounding the coils S1 and S2 changes in dependence on the position of the rotor elements (opposite the armature elements). It is simultaneously clear that also the dimensions of magnets and soft iron elements of the rotor have substantial influence on the magnitude of the flux. To the change of the magnetic flux in movement there corresponds a voltage induced in the armature conductors. The latter determines after multiplication with the current the mechanical performance of the motor/machine.

For the magnitude of the induced voltage, which is proportional to the flux change, there also proves significant the area ratio of magnet cross section to soft iron pole cross section, therefore the quotient $A_d/A_p$. With increasing area ratio and $A_d/A_p$ greater than 1, there can be achieved a field line densification under the pole elements E. $A_d$ and $A_p$ are proportional to the lengths represented in broken lines in FIG. 2. Through the collector arrangement it is possible to raise the air gap induction also over the remanence induction of the magnets. The efficiency of the motor can hereby be improved. A collector configuration for the arrangement of the magnets is known, for example, also through EP-A-126 997. Its usefulness is shown, for example, in that in addition to the possible increase of the air gap induction, the mass of the magnet material can be minimized. This is due to the fact that the magnets are driven in the point of highest energy density. It is clear, therefore, that besides the increased flux density in the air gap there can also be achieved an economical execution in respect to small magnet masses.

FIG. 2 shows that in movement of the rotor with respect to the pole elements, in these and also within the soft iron elements of the rotor there take place field direction changes. It is necessary, therefore, to make the soft iron elements in rotor and stator of coated material, especially sheet metal plates, or of densified iron powder.

Figure 3:
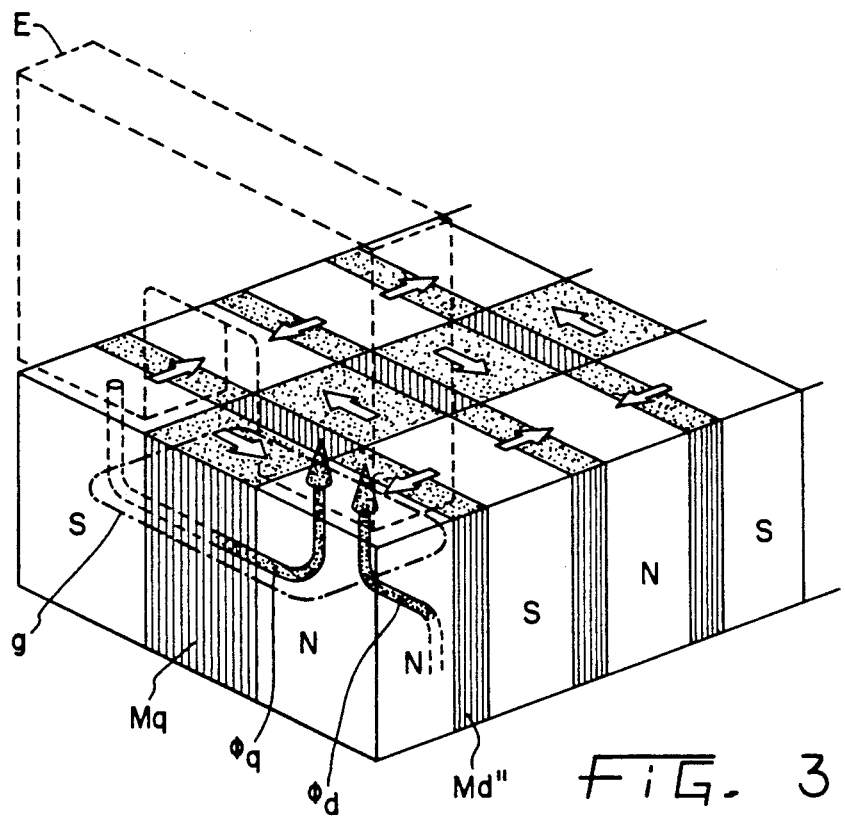
FIG. 3 shows a view of the exciter part in the execution according to FIG. 1 with drawn-in magnetization directions of the individual permanent magnets.

FIG. 3 gives an indication of the magnetization direction provided of the individual permanent magnets. This direction is marked in each case by arrows on the upper side of the magnets. It is evident that under this assumption the magnetization of the magnets Mq and Md is promoted. By their use in common it can be achieved that on paths g (dot-and-dashed line) only a small magnetic flux or no magnetic flux at all develops. This is equivalent to a strengthening of the useful magnetic flux generated by the magnets, entering over the air tap into the armature elements E. In FIG. 3 it is also indicated that, for example, in the first soft iron element, a second flux component $\phi_q$, which is generated by the magnet Mq, is superposed on the flux component $\phi_d$ that is generated by the magnet Md.

Also the arrangement Mq in FIG. 3 is made in such a way that the surface quotient $A_d/A_p$ is greater than 1, therefore a flux concentration takes place. Here, too, there hold the advantages described in the case of the Md magnets.

In comparison with the known flat magnet arrangement, now the permanent magnets in the rotor are turned in each case by 90° with respect to the air gap. Through the cross section enlargement herewith made possible the material of the permanent magnets can be used for the generation of an increased air gap flux and in conjunction with this for the increasing of the force density or for the achievement of an increased induced voltage. Moreover, smaller pole divisions are possible than without the use of the soft iron material, since the field lines can be strongly bunched through the soft iron pole elements in the rotor.

The arrangement described in FIG. 1 is normally only a part of an electric motor. There is now to be answered the question of what form is esepecially suitable for the machine in respect to its manner of function and its constructability.

It can surely be designated as favorable, if a small number of simply formed coils, as level as possible, is yielded and the functioning leads to largely continuous force formation. The latter means that time-dependent force fluctuations are small and commutation influences play only a light role. It is obvious that the problem ranges mentioned have a certain coupling. Simple constructive form with a small number of independent circuits (strights) means a certain degree of pulsating constituent in the force, as was described in WO 87/02525.

In the present machine concept it is a matter of an inverter-fed machine (or motor), the action strings (Wirkungsstränge) of which are supplied with energy over electronic positioning members. The force pulsations arising with low string number can be electronically compensated for with sufficient dimensioning of the positioning (setting) members and corresponding control stroke of the voltage. This compensation is in general necessary only with small turning speeds. In consequence of the small pole division the excitation frequency is comparatively high and the speed change passed on to the shaft of the machine (motor) is all the smaller, the higher the excitation frequency lies.

Figure 4:
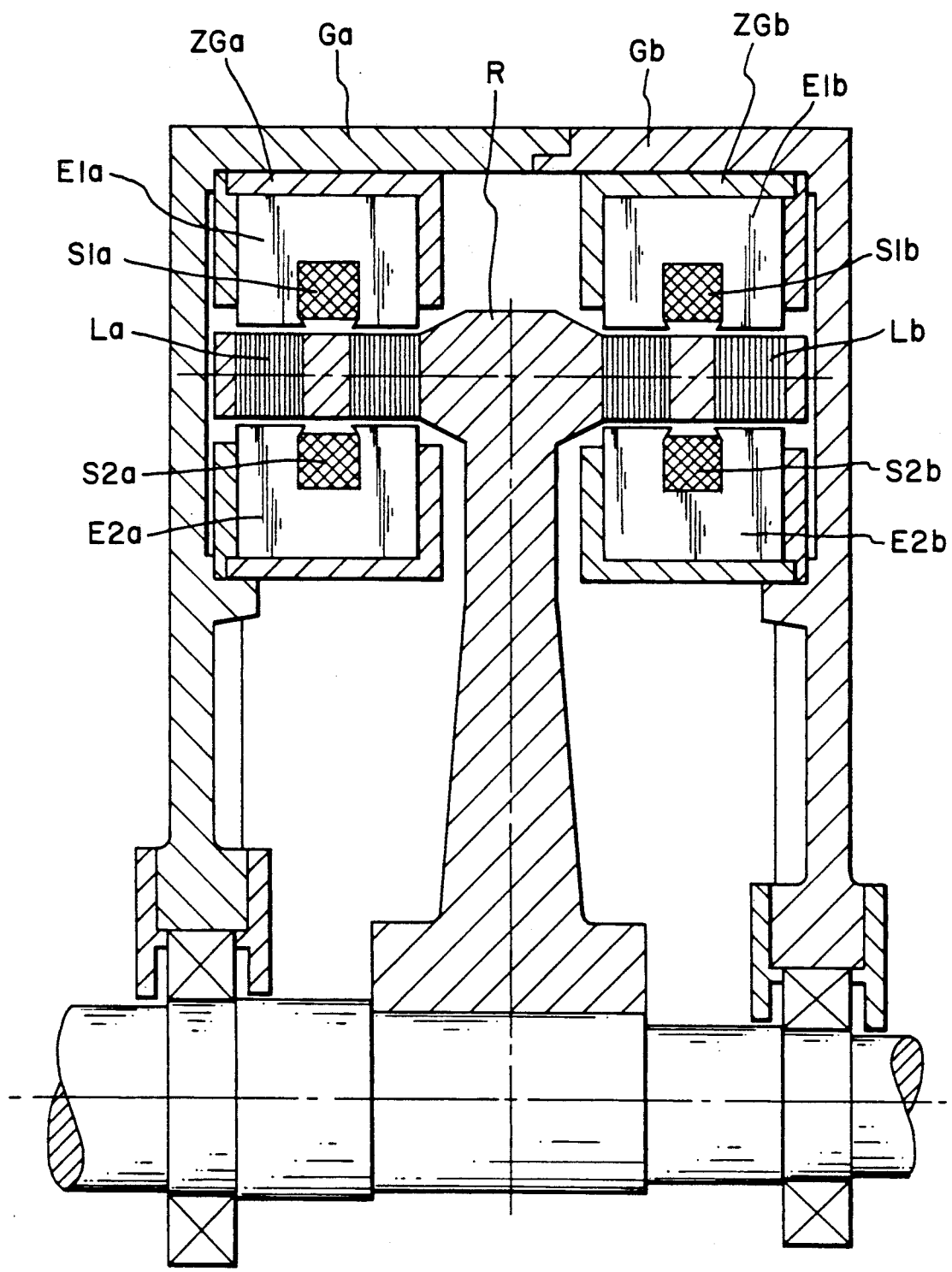
FIG. 4 shows in section a schematic representation of a machine/motor execution with a plurality of alternating current motors arranged adjacent to one another, which act on a common rotor.

The simplest motor construction form contains, according to FIG. 4, two strings of the stator winding with altogether four armature coils. Two coils of each armature side belong to a string and conduct rectified currents. Left and right sides are driven with currents of a phase displacement of 90°, so that even in a machine without fluctuation compensation it is possible to start from any position. The fluctuation amplitude amounts there to about 30% of the mean drive force. The two-string armature arrangement has, accordingly, annular coils in flat execution, which are very simply producible and are integratable with the pole elements of soft iron.

In FIG. 4 S1a and S2a designate the armature coils of the string a and S1b as well as S2b the armature coils of the string b. The pole elements E1a, E2a are soft iron parts allocated to the string a, the lower elements being offset by one pole division with respect to the upper elements. For the rotor elements drawn in cross section of the cylindrical rotor onsets La and Lb there holds an arrangement corresponding to FIG. 1.

Through the time shift of the current conduction of string b with respect to a there is also conditioned a corresponding local displacement by $\tau/2$. Hereby there is yielded a reduction of the force pulsations evoked by field density fluctuations similarly to the effect to a rotor tilting.

Through the symmetrical arrangement of the stators in respect to the rotor R given in FIG. 4, which rotor R is executed with a disk-form middle part, there is also achieved a form favorable for the assembling. The smallest unit, a string-half, is connected with the aid of an intermediate casing ZG with the appertaining casing shell G.

Figure 5:
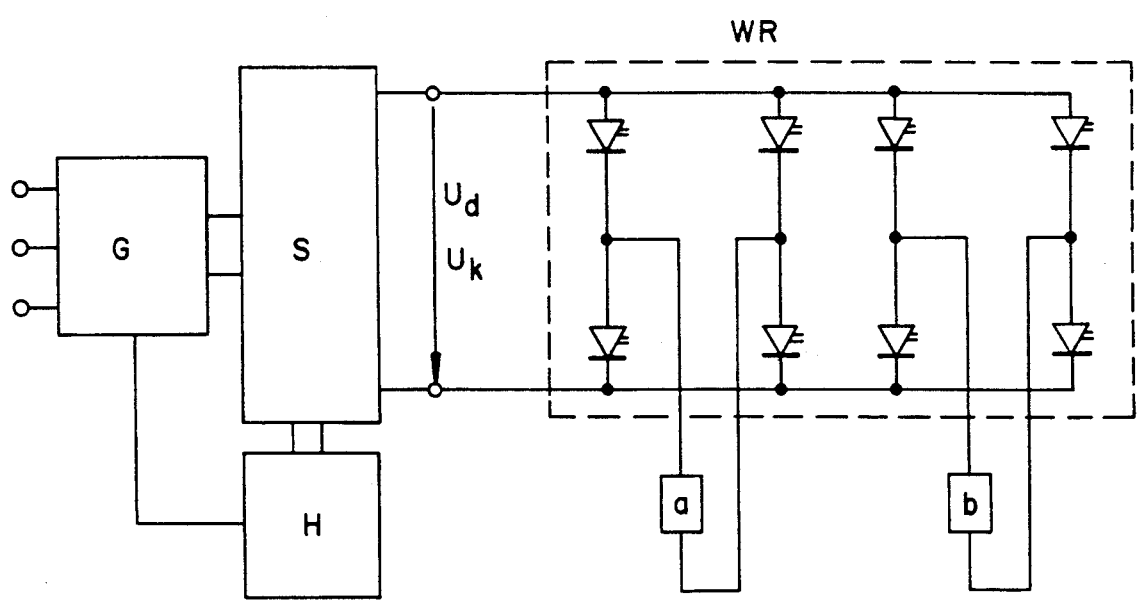
FIG. 5 shows a circuit for an alternating current motor according to the invention.

In FIG. 5, the circuit concept of the energy supplying of a two-string machine with the strings a and b is represented. The inverter (Wechselrichter) WR consists of two 4-quadrant controls. Here there are shown in the drawing only the main switching elements, but not, for example, the reactive-current diodes. If the inverter WR for the voltage adaptation is timed (getaktet) in pulse operation, then the direct voltage U, for example, can be obtained over an uncontrolled rectifier G from the three-string network (mains). In this case the component groups H and S become unnecessary.

If an accelerated commutation is sought with avoidance of the pulse operation of WR, then several further functions are required. The voltage U active during the working phase is adjusted by a direct-current setting member inside the apparatus S to the requisite value (regulated). In the time corresponding to the commutation beat, with the aid of H there is formed a voltage $U_k$ proportional to this time and inversely proportional to the amount of the current, which voltage is laid over a switching element in S onto the inverter (Wechselrichter) WR. There the upward-setting adjuster H can change the level of the communtation voltage in dependence, for example, on turning rate or load current.

Arrangements with higher string number can be given, with retention of the fundamental structure (FIG. 4) by a lateral extension. Thus, for example, a four-string machine is constructed by in each case two srings on one side of the rotor disk. The extension of the pole elements in axial direction goes back correspondingly with constant total force. An electronic force fluctuation compensation for small operating frequencies can already be dispensed with in this case. The chosen example for the machine (motor) construction is, to be sure, constructively favorable, but is not the only conceivable solution.

Thus, for example, the arrangement of the magnets also directly in the rotor disk, therefore turned through 90° with respect to FIG. 4, is possible and feasible. The stator arrangement is hereby changed correspondingly.

The motor construction form according to FIG. 4 presents, with respect to the disk-form arrangement, however, advantages inasmuch as it permits an axial shifting of the armature elements (with their windings) with corresponding execution of the casing. It is evident that by a shifting of the two armature parts outward there sets in a field weakening. With the shifting which is equal to the width of the poles, there is reached a field strength 0. Since here normally it is only a matter of small dimensions (in the centimeter range), this setting possibility of the field influencing can be used, for example, in vehicle motors for the voltage limitation, without there arising any appreciable widening of the machine (motor). Also for generators there can be utilized this gearing for the voltage limitation. The setting mechanism there has the function of moving the annular armature units axially with respect to the rotor center, with consideration taken of certain magnetic forces. With symmetrical shifts of both armature sides there does not arise any additional load there for the bearings of the motor.

I claim:

1. An alternating current motor comprising:
   a rotor having an exciter part arranged therein, said rotor rotatable in a given direction, and
   a stator with two fixed armature coils running in the direction of rotation,
   wherein each of the armature coils is surrounded on three sides by a plurality of substantially U-shaped soft iron elements arranged transversely in each case to the appertaining armature coil,
   the mean spacing of two successive soft iron elements corresponds in each case to two pole divisions, the free ends forming the stator poles of the soft iron elements of the one armature coil bound defining one side of an air gap and the free ends forming the stator poles of the soft iron elements of the other armature coil defining the other side of the air gap,
   the free ends of the soft iron elements on both sides of the gap are shifted by one pole division against one another in the direction of rotation,
   the exciter part comprises in the gap toward both sides of the gap and opposite the stator poles a permanent-magnetically excited series of soft iron blocks forming a series of exciter poles with the polarity of the poles alternating along the direction of rotation, characterized in that:
   between the soft iron blocks of the rotor exciter part in the gap plane along and/or transverse to the direction of rotation there are arranged permanent magnets magnetized with alternating polarity,
   and that the face surface of the permanent magnets lying opposite the soft iron blocks is greater than half the face surface of the exciter poles formed by the soft iron blocks on the air gap.

2. Alternating current motor according to claim 1, characterized in that the exciter part is axially arranged on the rotor.

3. Alternating current motor according to claim 1, characterized in that the exciter part is radially arranged on the rotor.

4. Alternating current motor according to claim 1, characterized in that the stator poles are arranged offset in the direction of rotation by one pole division on the one side of the gap to the stator poles on the other side of the gap, and that the armature coils are fed with in-phase current.

5. Alternating current motor according to claim 2, characterized in that the stator poles are arranged offset in the direction of rotation by one pole division on the one side of the gap to the stator poles on the other side of the gap, and that the armature coils are fed with in-phase current.

6. Alternating current motor according to claim 3, characterized in that the stator poles are arranged offset in the direction of rotation by one pole division on the one side of the gap to the stator poles on the other side of the gap, and that the armature coils are fed with in-phase current.

7. Multiphase electric motor, characterized in that a plurality of alternating current motors according to claim 1 are arranged offset adjacently in an axial direction in a machine casing, wherein for the individual motors the currents in the armature coils are phase shifted against one another and the pole elements of the stators are correspondingly displaced in a circumferential direction, and that the rotors act with the exciter units on a common shaft.

8. Multiphase electric motor, characterized in that a plurality of alternating current motors according to claim 2 are arranged offset adjacently in an axial direction in a machine casing, wherein for the individual motors the currents in the armature coils are phase shifted against one another and the pole elements of the stators are correspondingly displaced in a circumferential direction, and that the rotors act with the exciter units on a common shaft.

9. Multiphase electric motor, characterized in that a plurality of alternating current motors according to claim 3 are arranged offset adjacently in an axial direction in a machine casing, wherein for the individual motors the currents in the armature coils are phase shifted against one another and the pole elements of the stators are correspondingly displaced in a circumferential direction, and that the rotors act with the exciter units on a common shaft.

10. Multiphase electric motor, characterized in that a plurality of alternating current motors according to claim 4 are arranged offset adjacently in an axial direction in a machine casing, wherein for the individual motors the currents in the armature coils are phase shifted against one another and the pole elements of the stators are correspondingly displaced in a circumferential direction, and that the rotors act with the exciter units on a common shaft.

11. Motor according to claim 7, characterized in that the alternating current motors are arranged in pairs, that in each case two armature windings of the individual motor pairs are allocated to one winding string and conduct rectified currents.

12. Motor according to claim 7, characterized in that the two alternating current motors of a pair are driven with currents with a phase displacement of 90°.

13. Motor according to claim 11, characterized in that the two alternating current motors of a pair are driven with currents with a phase displacement of 90°.

14. Motor according to claim 7, characterized in that the alternating current motors are arranged in pairs and the exciter parts of the individual motor pairs are arranged on a common rotor.

15. Motor according to claim 11, characterized in that the alternating current motors are arranged in pairs and the exciter parts of the individual motor pairs are arranged on a common rotor.

16. Motor according to claim 12, characterized in that the alternating current motors are arranged in pairs and the exciter parts of the individual motor pairs are arranged on a common rotor.

* * * * *